(12) United States Patent
Sipes, Jr. et al.

(10) Patent No.: US 11,025,345 B2
(45) Date of Patent: Jun. 1, 2021

(54) HYBRID CABLE PROVIDING DATA TRANSMISSION THROUGH FIBER OPTIC CABLE AND LOW VOLTAGE POWER OVER COPPER WIRE

(71) Applicant: Radius Universal LLC, Lynbrook, NY (US)

(72) Inventors: Donald Lee Sipes, Jr., Colorado Springs, CO (US); John David Read, Elbert, CO (US)

(73) Assignee: Radius Universal LLC, Lynbrook, NY (US)

(*) Notice: Subject to any disclaimer, the term of this patent is extended or adjusted under 35 U.S.C. 154(b) by 0 days.

(21) Appl. No.: 16/054,064

(22) Filed: Aug. 3, 2018

(65) Prior Publication Data

US 2018/0375591 A1    Dec. 27, 2018

Related U.S. Application Data

(63) Continuation-in-part of application No. 15/399,397, filed on Jan. 5, 2017, which is a continuation-in-part
(Continued)

(51) Int. Cl.
*H04B 10/80* (2013.01)
*H04N 5/63* (2006.01)
(Continued)

(52) U.S. Cl.
CPC ......... *H04B 10/808* (2013.01); *G02B 6/4246* (2013.01); *G02B 6/4292* (2013.01);
(Continued)

(58) Field of Classification Search
CPC .. G02B 6/3817; G02B 6/4293; G02B 6/4448; H04B 10/808; H04L 12/6418; H04L 25/02; H04Q 11/0071
See application file for complete search history.

(56) References Cited

U.S. PATENT DOCUMENTS 4,449,784 A * 5/1984 Basov ............... G02B 6/3817
385/136
4,479,702 A * 10/1984 Pryor ............... G02B 6/4488
264/1.28
(Continued)

FOREIGN PATENT DOCUMENTS

JP         60188912 A      9/1985

OTHER PUBLICATIONS

U.S. Appl. No. 14/837,989, filed Aug. 27, 2015.
(Continued)

*Primary Examiner* — Timothy J Thompson
*Assistant Examiner* — Rhadames Alonzo Miller
(74) *Attorney, Agent, or Firm* — Leydig, Voit & Mayer, Ltd.

(57) ABSTRACT

A round hybrid cable includes: two metal wires, two fiber optic lines, and a cable jacket enclosing the two metal wires, the two fiber optic lines, and one or more spaces. The enclosing creates the one or more spaces. The round hybrid cable further includes a synthetic filling configured to fill the one or more spaces created by the enclosing. The two metal wires are arranged side by side and the two fiber optic lines are arranged above and below the two metal wires.

19 Claims, 13 Drawing Sheets

Related U.S. Application Data of application No. 15/233,312, filed on Aug. 10, 2016, now Pat. No. 10,139,569, which is a continuation-in-part of application No. 14/837,989, filed on Aug. 27, 2015, now Pat. No. 9,882,656, which is a continuation of application No. 14/836,600, filed on Aug. 26, 2015, now Pat. No. 10,171,180, which is a continuation-in-part of application No. 14/490,988, filed on Sep. 19, 2014, now abandoned.

(60) Provisional application No. 62/318,333, filed on Apr. 5, 2016, provisional application No. 61/880,030, filed on Sep. 19, 2013.

(51) Int. Cl.

| | | |
|---|---|---|
| H04N 5/232 | (2006.01) | |
| H04N 21/443 | (2011.01) | |
| H04Q 11/00 | (2006.01) | |
| H04L 12/10 | (2006.01) | |
| H04L 25/02 | (2006.01) | |
| H04B 10/077 | (2013.01) | |
| G02B 6/42 | (2006.01) | |
| G02B 6/44 | (2006.01) | |
| H04L 12/64 | (2006.01) | |
| H04B 10/073 | (2013.01) | |
| H04B 10/272 | (2013.01) | |
| G02B 6/38 | (2006.01) | |

(52) U.S. Cl.
CPC ......... *G02B 6/4293* (2013.01); *G02B 6/4416* (2013.01); *H04B 10/073* (2013.01); *H04B 10/077* (2013.01); *H04B 10/272* (2013.01); *H04L 12/10* (2013.01); *H04L 12/6418* (2013.01); *H04L 25/02* (2013.01); *H04N 5/23241* (2013.01); *H04N 5/63* (2013.01); *H04N 21/4436* (2013.01); *H04Q 11/0071* (2013.01); *G02B 6/3817* (2013.01); *G02B 6/3879* (2013.01); *G02B 6/4403* (2013.01); *G02B 6/4432* (2013.01); *G02B 6/4448* (2013.01)

(56) References Cited

U.S. PATENT DOCUMENTS

| | | | | |
|---|---|---|---|---|
| 4,538,024 A * | 8/1985 | Wise | ............ | H01B 7/0838 174/117 F |
| 5,109,452 A * | 4/1992 | Selvin | ............ | G02B 6/3817 385/56 |
| 5,242,315 A * | 9/1993 | O'Dea | ............ | G02B 6/3817 385/59 |
| 5,323,305 A | 6/1994 | Ikeda et al. | | |
| 5,342,991 A * | 8/1994 | Xu | ............ | H01B 7/0823 174/115 |
| 5,394,496 A | 2/1995 | Caldwell et al. | | |
| 5,398,295 A * | 3/1995 | Chang | ............ | G02B 6/3879 385/136 |
| 5,461,688 A * | 10/1995 | Lee | ............ | G02B 6/3817 385/75 |
| 5,539,851 A * | 7/1996 | Taylor | ............ | G02B 6/4416 174/102 R |
| 6,456,768 B1 * | 9/2002 | Boncek | ............ | G02B 6/3817 385/100 |
| 6,931,183 B2 * | 8/2005 | Panak | ............ | G02B 6/4405 385/101 |
| 6,974,262 B1 * | 12/2005 | Rickenbach | ............ | G02B 6/3817 385/53 |
| 7,404,091 B1 | 7/2008 | Gere | | |
| 7,480,753 B2 | 1/2009 | Bohm et al. | | |
| 7,966,502 B2 | 6/2011 | Diab et al. | | |
| 8,430,692 B2 * | 4/2013 | Peng | ............ | H01R 13/518 439/607.46 |
| 8,502,733 B1 * | 8/2013 | Negus | ............ | H04W 4/00 342/359 |
| 8,661,268 B2 | 2/2014 | Brooks et al. | | |
| 8,672,559 B2 | 3/2014 | Wang et al. | | |
| 8,935,543 B2 | 1/2015 | Hunter, Jr. et al. | | |
| 9,500,812 B2 | 11/2016 | Tanaka et al. | | |
| 9,500,815 B2 * | 11/2016 | Good | ............ | G02B 6/3883 |
| 9,690,732 B2 | 6/2017 | Balasubramanian et al. | | |
| 9,882,656 B2 | 1/2018 | Sipes, Jr. et al. | | |
| 2001/0016102 A1 * | 8/2001 | De Marchi | ............ | G02B 6/3893 385/75 |
| 2002/0191250 A1 | 12/2002 | Graves | | |
| 2005/0182883 A1 | 8/2005 | Overtoom | | |
| 2005/0229016 A1 | 10/2005 | Addy | | |
| 2005/0245115 A1 | 11/2005 | Bell | | |
| 2006/0089230 A1 | 4/2006 | Biederman et al. | | |
| 2006/0093277 A1 * | 5/2006 | Mulligan | ............ | G02B 6/3885 385/75 |
| 2006/0232386 A1 | 10/2006 | Jeon | | |
| 2007/0116411 A1 * | 5/2007 | Benton | ............ | G02B 6/3895 385/53 |
| 2007/0121832 A1 | 5/2007 | Ghoshal | | |
| 2007/0127873 A1 | 6/2007 | Manning et al. | | |
| 2007/0280610 A1 * | 12/2007 | Mallya | ............ | H01B 9/005 385/101 |
| 2009/0073957 A1 | 3/2009 | Newland | | |
| 2009/0172656 A1 | 7/2009 | Landry et al. | | |
| 2009/0175580 A1 * | 7/2009 | Chen | ............ | G02B 6/3825 385/75 |
| 2010/0036992 A1 | 2/2010 | Sisto | | |
| 2010/0171602 A1 | 7/2010 | Kabbara | | |
| 2010/0183262 A1 * | 7/2010 | Caveney | ............ | H01R 29/00 385/53 |
| 2010/0216341 A1 | 8/2010 | Bruant-Rich | | |
| 2010/0290787 A1 | 11/2010 | Cox | | |
| 2010/0299544 A1 | 11/2010 | Hansalia | | |
| 2010/0319956 A1 * | 12/2010 | Ballard | ............ | B60R 16/0207 174/105 R |
| 2010/0325324 A1 | 12/2010 | Aronson et al. | | |
| 2011/0026525 A1 | 2/2011 | He | | |
| 2011/0129188 A1 * | 6/2011 | Shimotsu | ............ | H01R 12/88 385/75 |
| 2011/0219244 A1 | 9/2011 | Wu | | |
| 2012/0059965 A1 | 3/2012 | Foster | | |
| 2012/0178303 A1 * | 7/2012 | Sakurai | ............ | H01R 13/6315 439/638 |
| 2012/0195556 A1 * | 8/2012 | Wang | ............ | G02B 6/3817 385/77 |
| 2012/0269484 A1 | 10/2012 | Peto | | |
| 2012/0284538 A1 | 11/2012 | Linne et al. | | |
| 2012/0311551 A1 | 12/2012 | Johnson | | |
| 2013/0007474 A1 | 1/2013 | Wilmes | | |
| 2013/0031378 A1 | 1/2013 | Schindler | | |
| 2013/0076133 A1 | 3/2013 | Gammel | | |
| 2013/0298173 A1 | 11/2013 | Couleaud | | |
| 2013/0301301 A1 | 11/2013 | Fischer | | |
| 2014/0029899 A1 * | 1/2014 | Isenhour | ............ | G02B 6/3829 385/79 |
| 2014/0072264 A1 | 3/2014 | Schroder | | |
| 2014/0147080 A1 | 5/2014 | Lambourn et al. | | |
| 2014/0372773 A1 | 12/2014 | Heath | | |
| 2015/0003790 A1 * | 1/2015 | Wu | ............ | G02B 6/3879 385/81 |
| 2015/0378428 A1 | 1/2015 | Selvarajan et al. | | |
| 2015/0106536 A1 | 4/2015 | Lauby et al. | | |
| 2015/0110444 A1 * | 4/2015 | Tanaka | ............ | G02B 6/3817 385/75 |
| 2015/0115405 A1 | 4/2015 | Wu et al. | | |
| 2015/0309271 A1 | 10/2015 | Huegerich et al. | | |
| 2015/0311645 A1 | 10/2015 | Chang | | |
| 2015/0318728 A1 | 11/2015 | Ghosh et al. | | |
| 2015/0331464 A1 | 11/2015 | Balasubramanian | | |
| 2016/0020858 A1 | 1/2016 | Sipes, Jr. et al. | | |
| 2016/0020911 A1 | 1/2016 | Sipes, Jr. et al. | | |
| 2016/0062935 A1 | 3/2016 | Talmola | | |
| 2016/0116685 A1 | 4/2016 | Wong et al. | | |

(56) References Cited

U.S. PATENT DOCUMENTS

| | | |
|---|---|---|
| 2016/0217093 A1 | 7/2016 | Whittington et al. |
| 2016/0294475 A1 | 10/2016 | Chappell et al. |
| 2016/0352101 A1 | 12/2016 | Koo |
| 2016/0370835 A1 | 12/2016 | Erickson et al. |
| 2016/0380777 A1 | 12/2016 | Sipes, Jr. et al. |
| 2017/0010645 A1 | 1/2017 | Jain et al. |
| 2017/0046289 A1 | 2/2017 | Hundal et al. |
| 2017/0154001 A1 | 6/2017 | Filser et al. |
| 2017/0185125 A1 | 6/2017 | Lin |
| 2017/0285271 A1 | 10/2017 | Sipes, Jr. et al. |
| 2018/0074564 A1 | 3/2018 | Paparrizos et al. |
| 2018/0131148 A1 | 5/2018 | Liu |
| 2018/0131283 A1 | 5/2018 | Ono |
| 2019/0356508 A1 | 11/2019 | Trikha |

OTHER PUBLICATIONS

U.S. Appl. No. 14/836,600, filed Aug. 26, 2015.
U.S. Appl. No. 14/490,988, filed Sep. 19, 2014.
U.S. Appl. No. 15/233,312, filed Aug. 10, 2016.
International Search Report for co-pending International Application No. PCT/US2014/056506, dated Dec. 29, 2014 (20 pages).
International Preliminary Report and Written Opinion for co-pending International Application No. PCT/US2014/056506, dated Mar. 31, 2016 (13 pages).
Technical Specification Sheet "PoE Extender over Hybrid Fiber," *Level One*, retrieved from www.level1.com/oneworld_one_brand_one_Level, (3 pages).
Technical Specification Sheet, "Hybrid Fiber Cable, 12/18 AWG," *Level One*, retrieved from www.level1.com/oneworld_one_brand_one_Level, (2 pages).
Data Sheet, "Hybrid Cable Assemblies," *Fiber Connections Inc.*, retrieved from www.fiber.com, DS19-7-2011, (2 pages).
Technical Specification Sheet, *Universal Interface Component of TE's Powered Fiber Cable System*, retrieved from www.te.com/TelecomNetworks ( 4 pages) 2014.
Data Sheet, "Ag5700-200W Powered Device Module," V1.2, *Silver Telecom*, Aug. 2012. (14 pages).
"Introduction to Power Over Hdbaset," *HDBaseT Alliance*, 2011, (6 pages).
Brochure entitled "Powered Fiber Cable System," *CommScope*, 2016, (6 pages).
OneReach™—PoE Extender System Brochure "Take PoE, PoE+, and now High PoE simplicity and gigabit capability to new distances," *Berktek*, (12 pages), publication date unknown.
Article entitled: "Fiber Optic Cables, Reels, Converters/Extenderes, Breakout Boxes and Rackmount," *Total Fiber Solutions*, www.camplex.com, (2 pages), publication date unknown.
Extended EP Search Report for related European Patent Application No. 14846208.8, dated Feb. 6, 2017.
International Search Report and Written Opinion of co-pending International Application No. PCT/US2017/025397 dated Jun. 16, 2017.
Bilton, Ricardo, "With new 100-watt standard, your USB cable could soon charge your laptop", Jul. 24, 2012, Venture Beat, https://venturebeat.co.2012/07/24/with-new-100-watt-standard-your-usb-could-soon-charge-your-lapto.
International Search Report for co-pending International Application No. PCT/US2020/029069 dated Aug. 31, 2020.

* cited by examiner

VIEW B

BOTTOM CONTACT (R.H.) SHOWN

CANTILEVER CONTACT BEAM

VIEW A

902 POWER WIRE

VIEW A

HYBRID CABLE PROVIDING DATA TRANSMISSION THROUGH FIBER OPTIC CABLE AND LOW VOLTAGE POWER OVER COPPER WIRE

CROSS-REFERENCE TO RELATED APPLICATIONS

This patent application is a continuation-in-part of U.S. application Ser. No. 15/399,397, filed Jan. 5, 2017, which is a continuation-in-part of U.S. application Ser. No. 14/837,989, filed Aug. 27, 2015, which is a continuation of U.S. application Ser. No. 14/836,600, filed Aug. 26, 2015, which is a continuation-in-part of U.S. application Ser. No. 14/490,988, filed Sep. 19, 2014, which claims the benefit of U.S. Provisional Application No. 61/880,030, filed Sep. 19, 2013, all of which are incorporated herein by reference in their entireties.

This patent application is also a continuation-in-part of U.S. application Ser. No. 15/233,312, filed Aug. 10, 2016, which claims the benefit of U.S. Provisional Application No. 62/318,333, filed Apr. 5, 2016, all of which are incorporated herein by reference in their entireties.

BACKGROUND

After a number of years of enterprise Local Area Network (LAN) evolution, a stable architecture has been arrived at that has become ubiquitous worldwide (with over 3 billion LAN user connections in 2010 projected to grow to over 20 billion by 2020). This architecture is essentially a star topology where every user computer or other network connected device is connected to a Layer 2 switch via a direct cable. The upstream ports on the switch are connected to servers, routers or other switches to complete the network.

In the vast majority of these networks, the cables connecting these user devices to the switch is CAT 5 cable, and the connection protocol is 100 Megabit Ethernet with a maximum span length of 100 m. Power can be provided in addition to the communications via the Power over Ethernet (PoE) standard to a maximum of 30 W. In facilities where there are longer distances, the "edge" switches are placed closer to the user, and networks of switches are created to create an additional network upstream of the edge switch. Network performance is characterized by not only the speed of the data links, but also the delay, or latency, for the signals to go over the cable and through the layers of switching devices. The more switches in line between a user and another user or a server or the internet the worse the overall network performance.

The exponential growth in both the number of network connected devices and in the consumption of multimedia-related content places increasing demands for higher bandwidth on the enterprise networks that support them. However, conventional network configurations, which are often based on home-run connections from an edge switch to a client device based on long runs of Category 5 (CAT 5) cables, are unable to accommodate the bandwidth growth necessary to meet these increasing demands due to the limitations in bandwidth over long distances for CAT 5 cables.

In particular, Layer 2 switches comprise Input/Output interfaces and a switch fabric. Layer 2 switching is very fast and has low latency. The inclusion of other network features has led to the deployment of edge switches that have Layer 3 and 4 functionality as well. The addition of mobile users and the need for reconfigurability has led to the LAN network being overlaid with wireless multi-access networks such as defined by the 802.11 WiFi standard. Early Layer 2 star networks were used primarily for accessing local network resources such as servers, storage, or printers or wide area network or basic WAN internet functions such as email and web page viewing. New applications, such as video viewing, rich media web or social networks and video conferencing, have increased the need for higher bandwidth, lower latency (delay) LAN networks. Unfortunately, current networks are limited to 100 Mbs by the use of the CAT 5 Cable and the lengths of the cable runs. One way that networks are being upgraded to achieve 1000 Mbs or 1 Gbs speed is by moving the edge switch closer to groups of users, often below 20 m where 1000BaseT (Gigabit Ethernet) will run reliably on CAT 5 cable. While solving the cable speed problem, this approach introduces additional problems by both increasing network complexity and network latency.

Network administrators try to achieve better performance by upgrading the cable in the user home run links to higher grades of cable like Category 6 (CAT 6) or Category 7 (CAT 7) cable. These types of solutions are in themselves only temporary as bandwidth increases above 1 G to 10 G will only bring back the same problem. These conventional upgrade approaches, involving replacement of existing CAT 5 cables with CAT 6 or CAT 7 cables or adding remote network switches deep in the network within GbE reach of a CAT 5 cable, are not ideal, as they add significant amounts of network latency and complexity while only offering modest improvements to overall network performance. Further, these higher-category cables have significant cost premiums.

Using fiber optic links instead of CAT cables is another option in communications networks, but fiber optic technology has not gained much traction in the enterprise network context due to the high cost of conventional fiber optic transceivers, the labor costs involved in installing and terminating conventional fiber optic links, and the inability of conventional fiber optic links to interface with Power over Ethernet (PoE) connections and network components utilizing the PoE standard.

SUMMARY

In an embodiment, the present disclosure provides a round hybrid cable, comprising: two metal wires; two fiber optic lines; a cable jacket enclosing the two metal wires, the two fiber optic lines, and one or more spaces, wherein the enclosing creates the one or more spaces; and a synthetic filling configured to fill the one or more spaces created by the enclosing; wherein the two metal wires are arranged side by side and the two fiber optic lines are arranged above and below the two metal wires.

In another embodiment, the present disclosure provides a flat hybrid cable, comprising: two metal wires; two fiber optic lines; a cable jacket enclosing the two metal wires, the two fiber optic lines, and one or more spaces, wherein the enclosing creates the one or more spaces; and a synthetic filling configured to fill the one or more spaces created by the enclosing; wherein the two metal wires are arranged side by side and the two fiber optic lines are disposed on either side of the two metal wires.

In yet another embodiment, the present disclosure provides a ribbon hybrid cable, comprising: two metal wires; two fiber optic lines; a cable jacket enclosing the two metal wires, the two fiber optic lines, and one or more spaces, wherein the enclosing creates the one or more spaces; and a synthetic filling configured to fill the one or more spaces created by the enclosing; wherein the two fiber optic lines are arranged side by side and the two metal wires are disposed on either side of the two metal wires.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
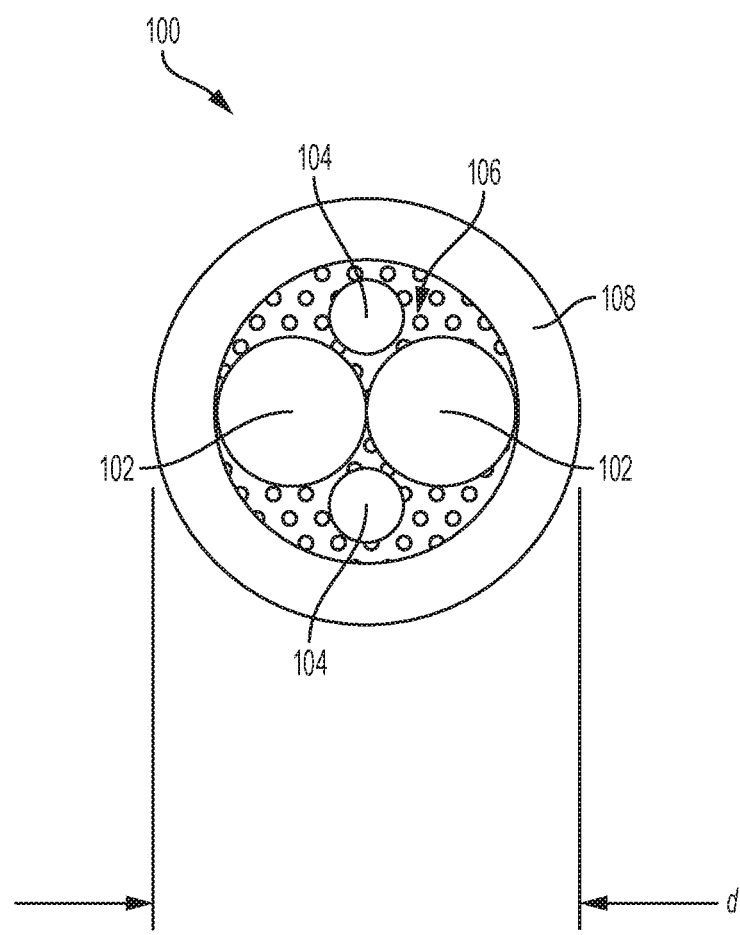
FIG. 1 illustrates a cross-section of a round hybrid cable according to one embodiment of the disclosure.

Pending application U.S. application Ser. No. 14/837,989 describe exemplary fiber optic communications and power networks wherein fiber optic cable is run from a remote location, such as where the utility company brings it into the building, to a location closer to the client device, sometimes called the end user device such as a television, a dumb terminal a laptop computer, a security camera or a point of sale terminal. At that point, copper wire is married to the fiber optic cable to form a hybrid cable. The hybrid cable carries low voltage power over the copper lines while carrying high-speed data over fiber lines. The use of low voltage power enable the use of very small copper wires, on the order of about 22 to 18 gauge wire.

Exemplary embodiments of the present application provide hybrid cable configurations that are usable, for example, in exemplary fiber optic communications and power networks described in U.S. application Ser. No. 14/837,989. Embodiments of the disclosure utilize, for example, glass, glass and polymer (GGP) fiber with a Mechanical/Dynamic Fatigue of n=30 to build a cable construction specifically suited for horizontal cable installation (horizontal cable installation is cable installation that runs within a floor of a building while vertical cable installation is cable installation that runs from one floor to another). The n value describes bend insensitive glass specifications by the Telecommunications Industry Association (TIA) and International Electrotechnical Commission (IEC). It is a series of tests revolving around repeat bending, underwater stress tight (3 mm) bending, and elongation. It gives a mathematical estimation of the life expectancy of a piece of glass under duress over time. With a minimum value of n=18 for the TIA and IEC standard, an n=30 may indicate that the fiber can take a 2.2 mm bend and maintain a 31 year life expectancy. These properties allow for building smaller fiber cables in smaller constructions, as well enables a lack of certification for installing the fiber. The cable construction incorporates two strands of fiber, either single mode or multi-mode, that do not employ a tight buffer. Rather they are simply coated with a 250 μm acrylate coating, and two 18-22 American wire gauge (AWG) stranded or solid insulated copper leads, with a Kevlar sheath utilizing water absorbing tape in an overall jacket having a diameter of about 3.5-4 mm. The cable construction meets Plenum, Riser and Low Smoke Zero Halogen (LSZH) testing requirements (i.e., LSZH is an International Cable standard now being adopted by California and other states).

The values quoted above are merely exemplary and represent example parameters that may be used for achieving a very small diameter cable; different fiber buffer coatings, AWG sizes and jacketing types may be used for other cable configurations. An advantage to utilizing a cable construction with such a configuration is the very small size of these cables (<4 mm diameter), which is highly sought after in a fiber deep architecture. In a more environmentally challenging environment, a larger fiber coating may be used to realize longer cable pull lengths. Additionally, larger wire AWG may be used for longer cable runs and strength members, and a more robust jacketing may be useful for more challenging environments. A more robust jacketing may also be used for trunks, where more critical data is run in a computing networked system. Traditional fiber optic cables are used mostly for trunking applications. Cables constructed in accordance with some embodiments of the disclosure may be optimized for the fiber deep architecture because these cables may exhibit a small diameter, a lighter weight compared to other fiber cables, and a lower cost compared to other fiber cables.

In some embodiments, the cable construction may incorporate more than two strands of fiber, for example, three or more strands of fiber. In these constructions, the extra fibers may be used as spare fibers, for example, in mission critical links. In some embodiments, the cable construction may incorporate only one strand of fiber. The one strand of fiber facilitating a bidirectional passive optical network (PON). In the case where only a single strand of fiber is used, the hybrid cable construction may further exhibit a smaller diameter compared to a multi-fiber construction.

FIG. 1 illustrates a cross-section of a "round" hybrid cable 100 according to an exemplary embodiment of the disclosure. The round hybrid cable 100 is shown to have a diameter d, metal wires 102, and fiber optic cables 104. In an embodiment of the round hybrid cable as shown in FIG. 1, two metal wires 102 are arranged side by side separating two fiber optic cables 104 which are arranged above and below the two metal wires 102. The metal wires can be insulated with standard electrical insulation. In an embodiment of the round hybrid cable, the diameter d of the cable may range from 1.5 mm to 3.5 mm. The fiber optic cables 104 may have a diameter ranging from 0.25 mm to 0.9 mm, and the metal wires 102 may have AWG sizes ranging from 24 to 18. In an example, if the diameter d of round hybrid cable is 3.5 mm, two 125 μm diameter fibers 104 may be separated from one another with two 18 AWG copper wires 102. Space not filled by either the fibers or copper wires are filled with a synthetic filling, for example, synthetic fiber material 106. The synthetic fiber material 106 may be a relatively strong fiber material such as Kevlar so as to achieve a relatively smaller form factor with respect to the size of the hybrid cable. The arrangement is surrounded by a jacket 108.

In an embodiment, when communications is bidirectional, a single fiber is used in the hybrid cable. For certain applications, more fibers or more wires can be used (for example for sparing fibers). Instead of having to use lower AWG wire, more wires may be used to carry more current, thus the application and expected current carrying capacity may dictate the number of wires incorporated in the hybrid cable. The length of the wires can be set by expected power loss on the cable which can be determined as $I^2R$, where I is the expected current through the wires and R is the resistance of the wires. In an embodiment, the wires can be around 30 m in length, but by decreasing the AWG of the fiber longer lengths can be contemplated.

Figure 2:
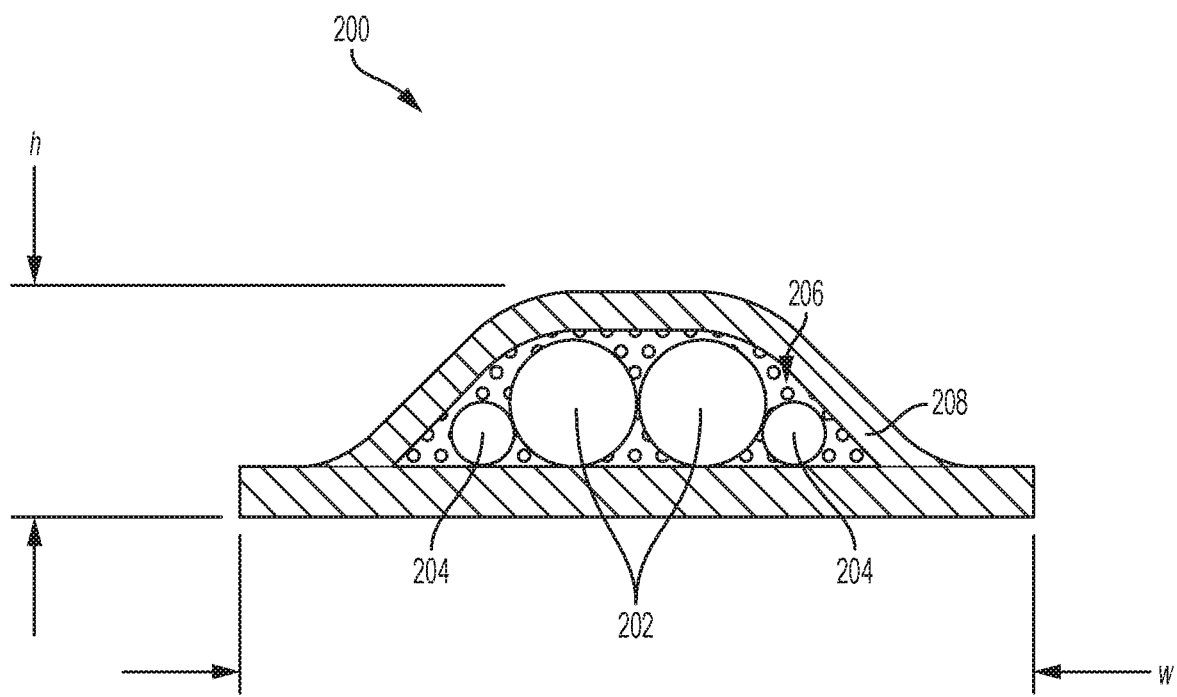
FIG. 2 illustrates a cross-section of a flat hybrid cable according to one embodiment of the disclosure.

FIG. 2 illustrates a cross-section of a "flat" hybrid cable 200 according to an exemplary embodiment of the disclosure. The flat hybrid cable 200 is shown to have a height h and an outside width w. Within the flat hybrid cable 200, metal wires 202 are disposed horizontally between fiber optic cables 204, and the remaining spacing between jacket 208 and either of the metal wires 202 and fibers 204 is filled with a synthetic fiber material 206 (e.g., Kevlar). In some embodiments, the height h of the flat hybrid cable 200 may range from 1.5 mm to 2.3 mm, the width w of the flat hybrid cable may range from 5.0 mm to 7.7 mm, the metal wires 202 range from 24 to 18 AWG copper wires, and the fibers 204 are 125 µm diameter fibers. In an exemplary embodiment, a flat hybrid cable 200 may be constructed with the following parameters: the height h of 2.3 mm, the width w of 7.7 mm, the metal wires 202 being 18 AWG copper wires, and the fibers 204 being 125 µm diameter fibers.

Figure 3:
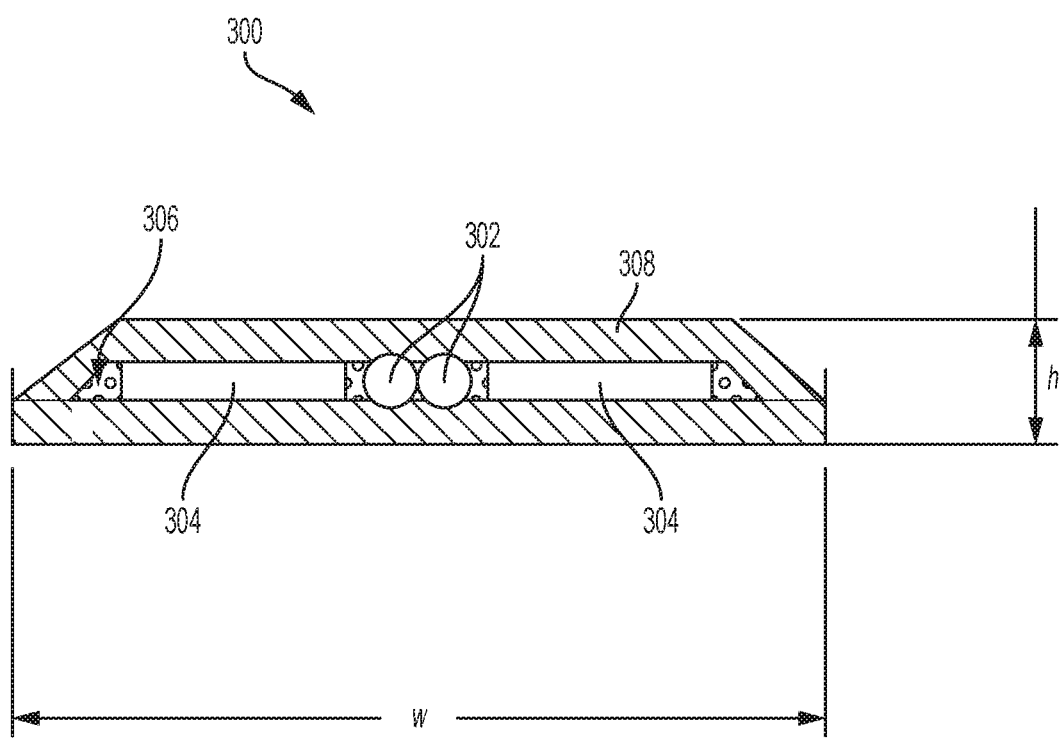
FIG. 3 illustrates a cross-section of a ribbon hybrid cable according to one embodiment of the disclosure.

FIG. 3 illustrates a cross-section of a "ribbon" hybrid cable 300 according to an exemplary embodiment of the disclosure. The ribbon hybrid cable 300 is shown to have a height h and a width w. Within the ribbon hybrid cable 300, fiber optic cables 302 are disposed between metal wires 304, and the remaining spacing between jacket 308 and either of the metal wires 304 and fibers 302 is filled with a synthetic fiber material 306 (e.g., Kevlar). In some embodiments, the height h of the ribbon hybrid cable 300 can reach 3-5 mm, the width w of the ribbon hybrid cable can reach 1 cm, the metal wires 304 have a rectangular cross-section, and the fibers 302 can be 125 µm diameter fibers. The rectangular cross-sectional area of the metal wires 304 can range from equivalent cross-sectional areas of 24 AWG to 18 AWG round wires. In an exemplary embodiment, the height h of the ribbon hybrid cable 300 is 1.4 mm, the width w of the ribbon hybrid cable is 9.3 mm, the rectangular cross-section of the metal wires 304 have dimensions 2.50 mm by 0.40 mm, and the fibers 302 are 125 µm diameter fibers.

The round, flat, and ribbon hybrid cables of FIGS. 1-3 have been shown to include two metal wires and two fiber optic lines, but other embodiments may include more than two fiber optic lines and more than two metal wires or may include one fiber optic line and one metal wire.

The flat hybrid cable of FIG. 2 and the ribbon hybrid cable of FIG. 3 may alleviate various concerns when installed under carpeting. For example, certain embodiments with lower height h prevent the cables to be seen under carpeting when height h is lower than the carpet padding. In addition to preventing seeing the cable under carpeting, the flat and ribbon hybrid cables may prevent cable damage when, for example, an office chair rolls over the cables. For example, in FIG. 3, the metal wires 304 are positioned to shield the fibers 302 from a mechanical item rolling over the ribbon hybrid cable from the side. By positioning the fibers on the inside and the metal wires on the outside as shown in FIGS. 2 and 3, the fibers may be shielded by the metal wires.

As can be seen in FIGS. 1-3, exemplary embodiments of the cabling structures described herein thus provide various advantages over conventional cabling structures, which typically utilize thicker filling and jacket components and are subject to various safety regulations. For example, unlike conventional cabling structures, the ribbon hybrid cable and the flat hybrid cable embodiments discussed herein may be used under carpeting for power and/or data routing, which provides for a flexible and efficient solution to the problem of how to route cables within various environments, such as office spaces. In an example office space with multiple cubicles set up in the middle of a room, in order to route power to each cubicle, the concrete floor would need to be dug up to bury the cables so as to not interfere with free mobility of individuals in the office. Another reason why the cables would need to be buried is that the high voltage associated with building power routing would present a work hazard when openly exposed. Thus, power routing in office space environments can become expensive. Embodiments of the disclosure provide cabling structures that may be used to route a lower power enough to power devices present at each cubicle. In one example, the lower power may be power of at most 100 W. The ability to use the lower power rating, as well as the relatively small form factor, allows these cabling structures to be run safely, for example, under carpets, behind wallpapers, behind walls, etc. The flat and ribbon hybrid cables can be run discreetly to distribute power and/or data without the need to shield the cables to the extent of a high voltage or high power delivering cable.

Converters

In some embodiments, round hybrid cables and flat or ribbon hybrid cables can be used in different areas of an installation, and a converter may be used to connect a flat hybrid cable to a round hybrid cable. Round cables may be used with connectors already on the market and as such may be closer to the device being powered while the flat and round hybrid cables may be used for routing within a room or building. FIGS. 4A-4B, 5A-5C, and 6A-6D illustrate various embodiments of converters that may be used to connect a flat hybrid cable to a round hybrid cable.

Figure 4A:
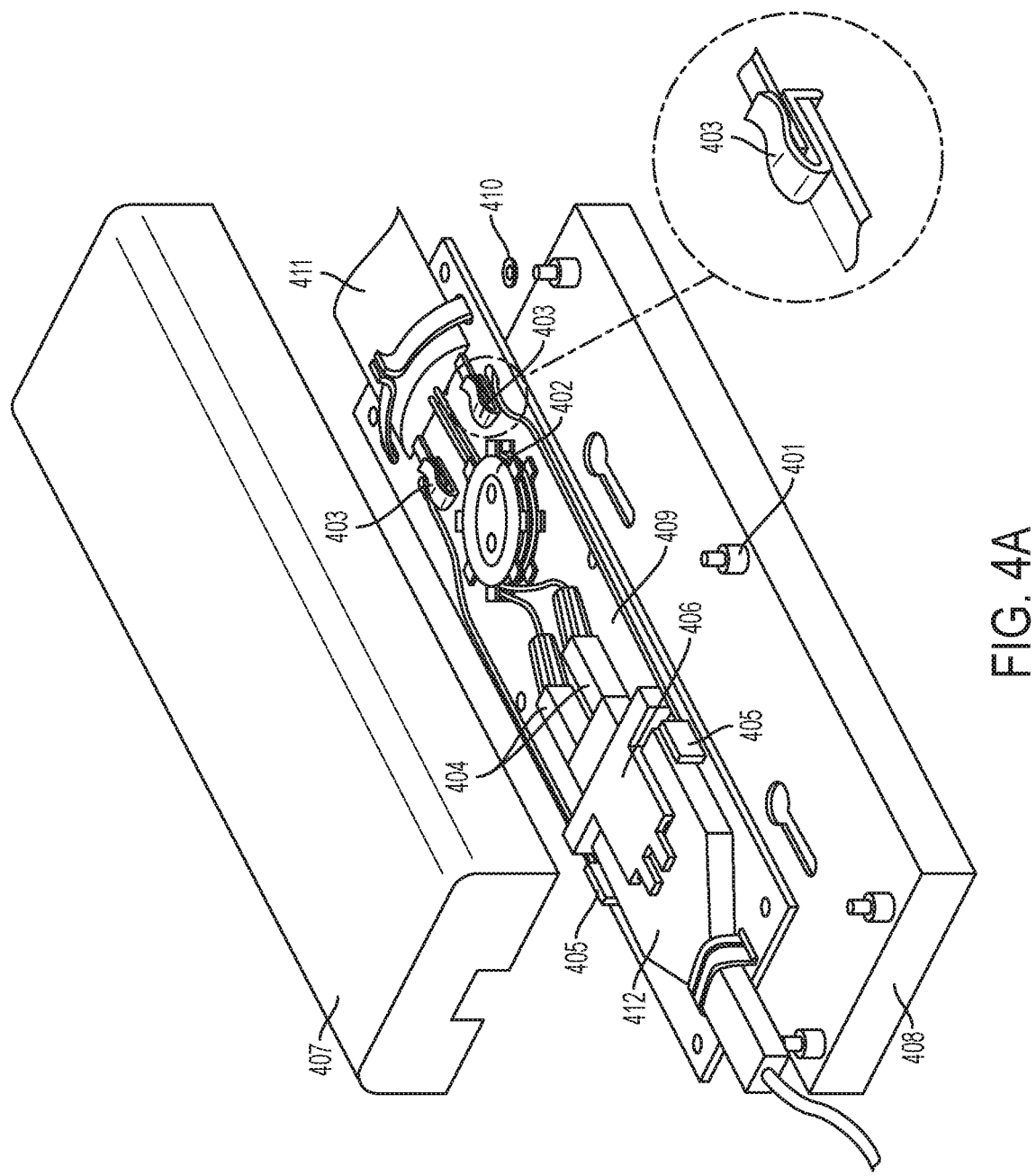
FIGS. 4A-4B illustrate an embodiment of a flat hybrid cable to a round hybrid cable converter box.

FIG. 4A illustrates an embodiment of a flat hybrid cable to a round hybrid cable converter box. The converter box may include a top cover 407 and a bottom cover 408. The top cover 407 and the bottom cover 408 are configured to couple with one another to serve as a housing for electrical and mechanical components disposed on a printed circuit board (PCB) 409.

The PCB 409 may include one or more holes for coupling to one or more posts provided on the bottom cover 408. The PCB 409 may be held in place using, for example, push fasteners 410. The PCB 409 may include a round hybrid cable assembly 412 and a flat hybrid cable assembly 411. The round hybrid cable assembly 412 may include one or more power contacts 405. The flat hybrid cable assembly 411 may include one or more power contacts 403. The one or more power contacts are configured to connect to respective copper cables in each hybrid cable assembly.

Figure 4B:
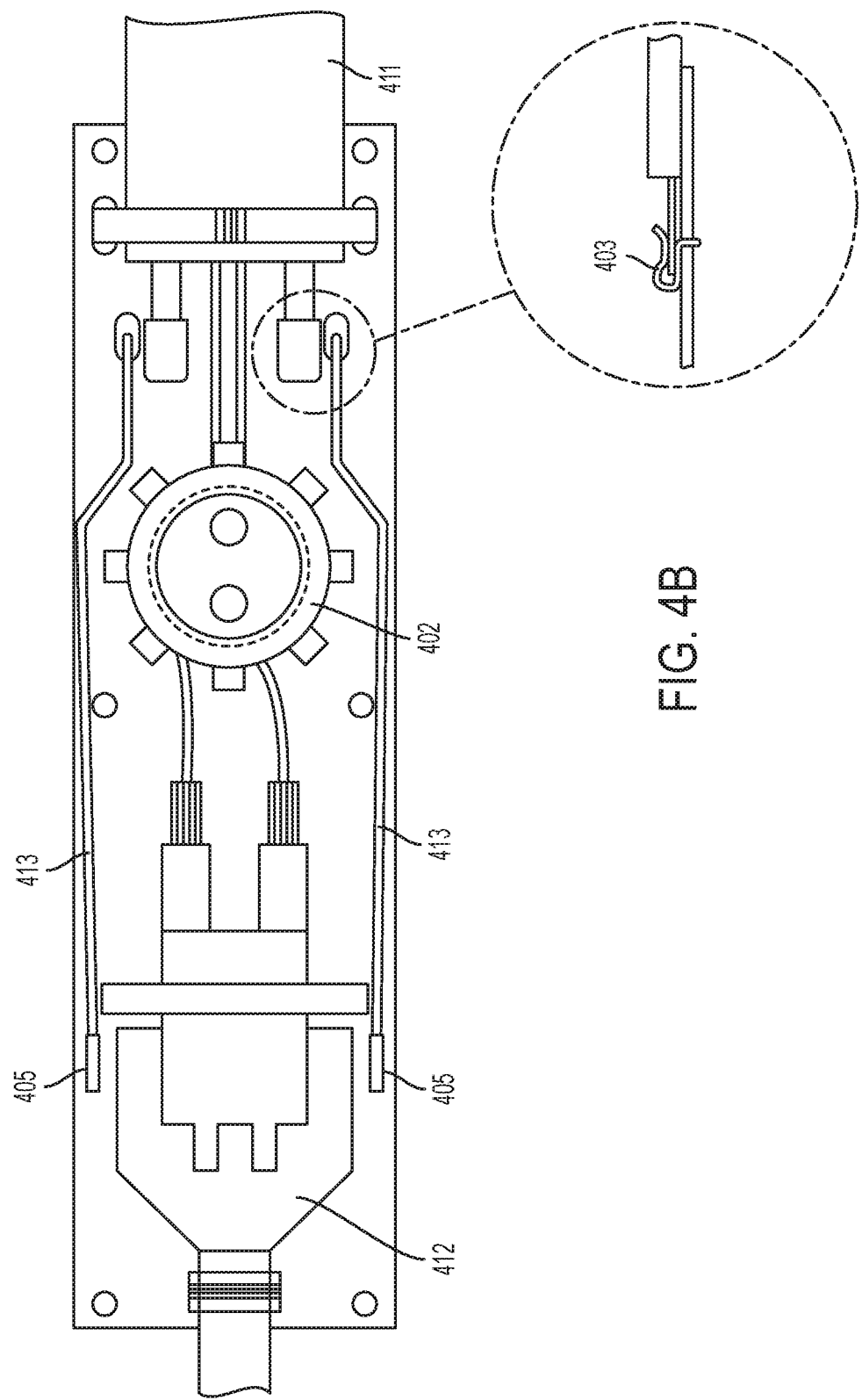

The PCB 409 may further include fiber terminators 404 and an LC double bulkhead 406 for interfacing with fiber cables in the round hybrid cable assembly 412. The fiber terminators 404 are connected to one end of fibers that are wound around a fiber store 402. The other end of fibers that are wound around the fiber store 402 interface with the fiber cables in the flat hybrid cable assembly 411. FIG. 4B illustrates a top view of the PCB 409 showing the flat hybrid assembly 411 being interfaced with the round hybrid assembly 412. The top view of the PCB 409 shows that the power contacts 403 are connected to the respective power contacts 405 using wire tracks 413.

FIG. 4A illustrates an embodiment of a flat hybrid cable to a round hybrid cable converter box where the round hybrid cable assembly 412 is provisioned with a connector, for example, an LC connector for ease of installation but the flat hybrid cable assembly 411 is not provisioned with a connector. An embodiment where neither the flat hybrid cable assembly 411 nor the round hybrid cable assembly 412 are provisioned with connectors may be provided. Another embodiment where the flat hybrid cable assembly 411 is provisioned with a connector, and the round hybrid cable assembly 412 is not provisioned with a connector may be provided. In one embodiment, a side with the flat hybrid cable assembly is the input side of the converter box, and a side with the round hybrid cable assembly is the output side of the converter box.

Figure 5A:
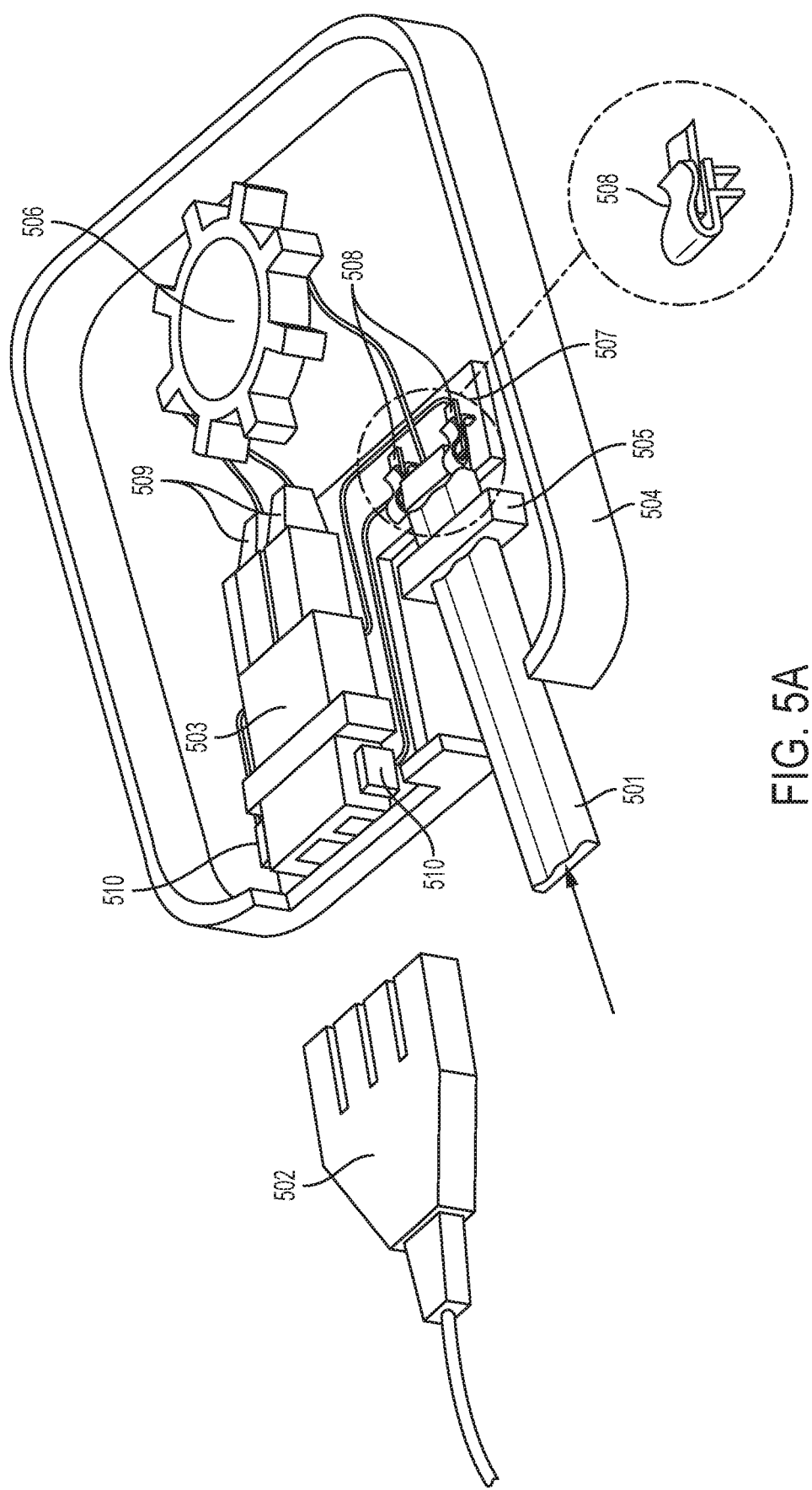
FIGS. 5A-5B illustrate another embodiment of a flat hybrid cable to a round hybrid cable converter box.
Figure 5B:
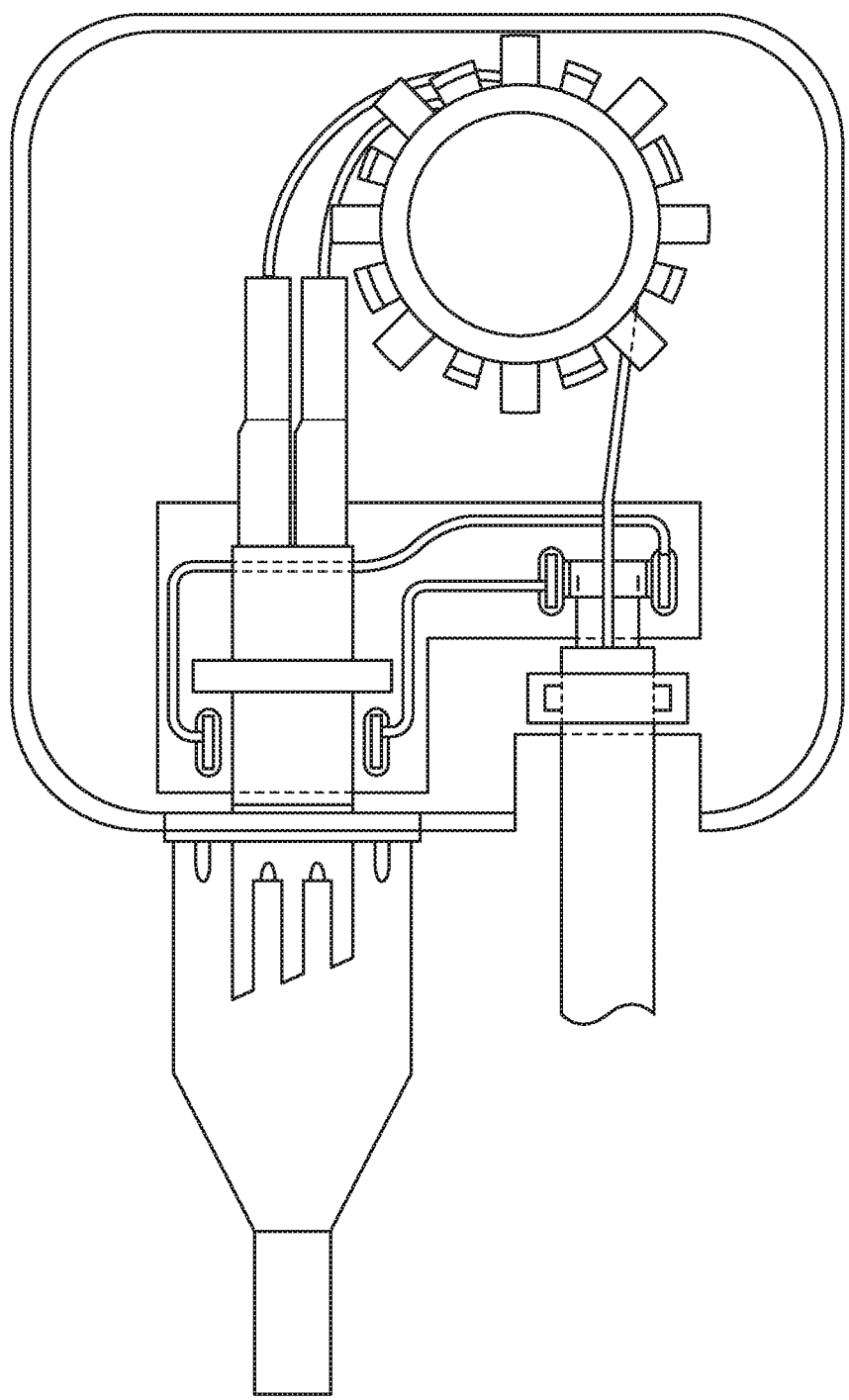

FIG. 5A illustrates another embodiment of a flat hybrid cable to a round hybrid cable converter box. The converter box in FIG. 5A is designed to receive a round hybrid cable assembly connector 502 at an LC dual bulkhead 503. Similar to FIG. 4A, the LC dual bulkhead 503 is connected to fiber terminators 509 which feed into a fiber store 506 which is connected to fiber cables coming from a flat hybrid cable assembly 501. The flat hybrid cable assembly 501 may be connected to a PCB 507 and clamped down by a cable clamp 505. The top cover of the converter box of FIG. 5A is not shown, but the bottom cover 504 is. The converter box of FIG. 5A may receive both the flat hybrid cable assembly 510 and the round hybrid cable assembly 502 on the same side as shown in FIG. 5A, on opposite sides (as shown in FIG. 4A), or on sides orthogonal to one another. FIG. 5B shows a top view of the converter box of FIG. 5A.

Figure 6A:
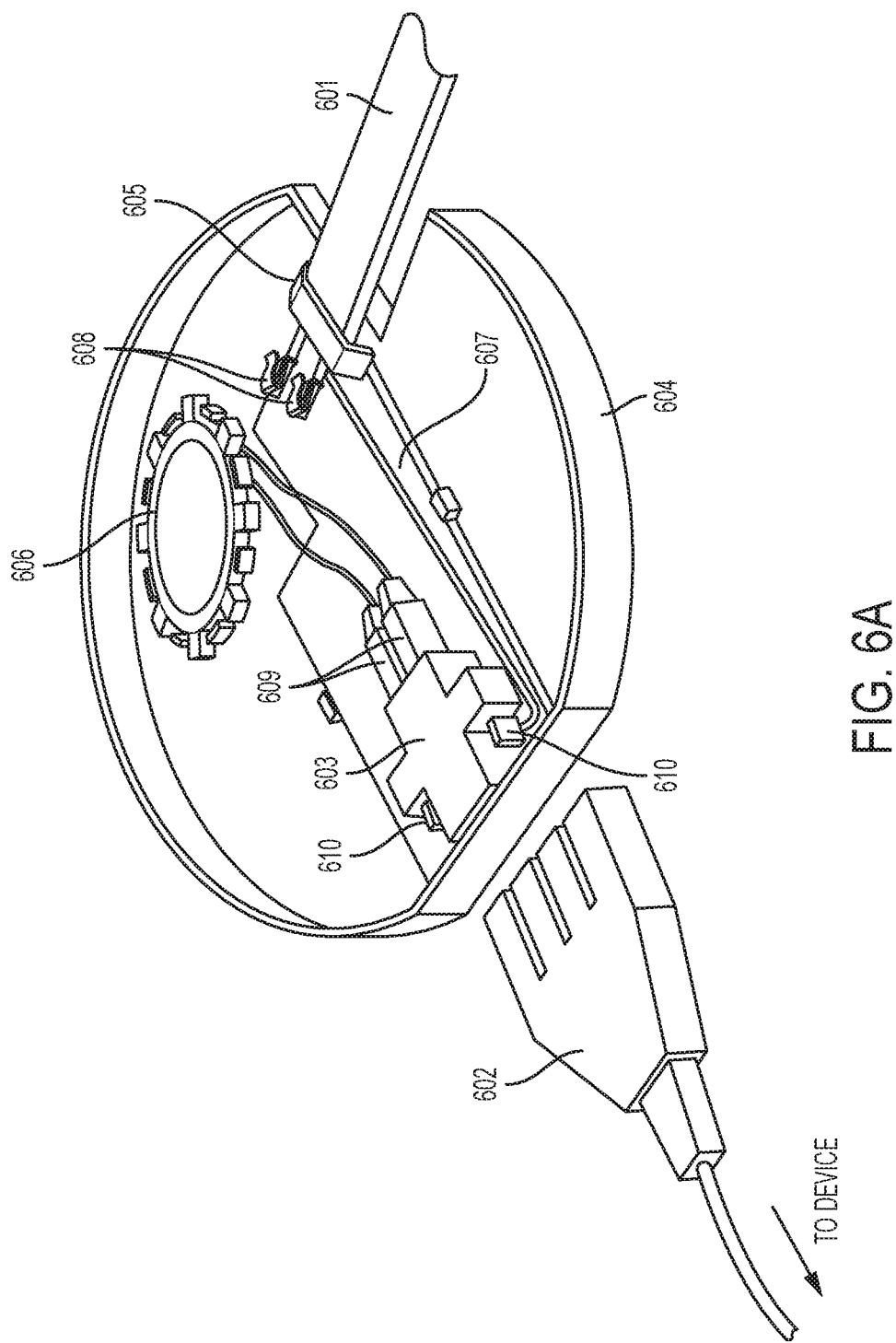
FIGS. 6A-6B illustrate yet another embodiment of a flat hybrid cable to a round hybrid cable converter box.
Figure 6B:
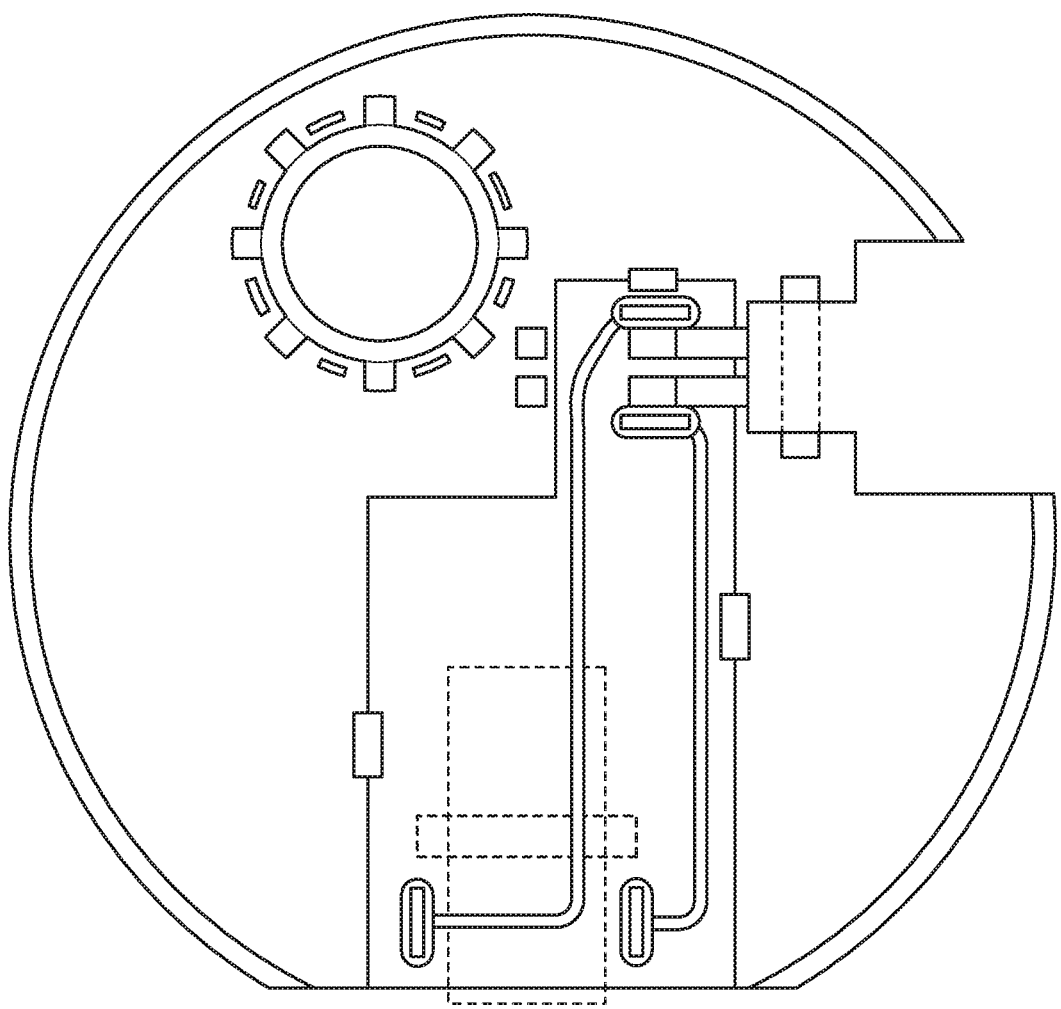

FIG. 6A illustrates another embodiment of a flat hybrid cable to a round hybrid cable converter box. The converter box in FIG. 6A has a bottom cover 604 with round edges compared to the converter boxes of FIGS. 4A and 5A. The converter box includes a flat hybrid cable assembly 601, an LC dual bulkhead 603 configured to receive a round hybrid cable assembly 602, fiber terminators 609, a fiber store 606, and a cable clamp 605. Power contacts 610 are connected to power connectors 608 through the PCB 607. FIG. 6B shows a top view of the converter box of FIG. 6A.

Figure 7:
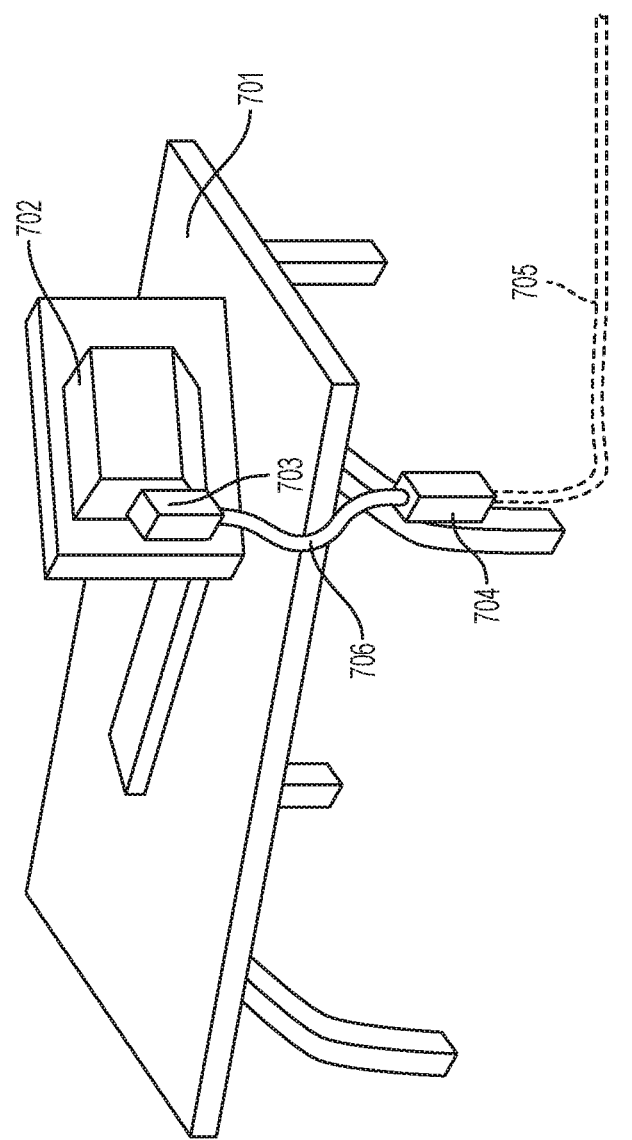
FIG. 7 illustrates an example environment using a hybrid cable according to an embodiment of the disclosure.

FIG. 7 illustrates an example environment using a hybrid cable according to an embodiment of the disclosure. The environment in FIG. 7 shows a desk 701 with a display 702. The display 702 has a media converter 703 used to interface a round hybrid cable 706. The media converter 703 is configured to provide the display 702 power and data connection through the round hybrid cable 706. The environment further includes a flat to round hybrid cable converter 704 according to some embodiments of the disclosure. The flat to round hybrid cable converter 704 interfaces the round hybrid cable 706 and the flat hybrid cable 705.

Connectors

Field installation of optical fiber can be a relatively complicated and difficult task, typically requiring the involvement of a technician with the appropriate experience and expertise.

Embodiments of the present invention, however, provide connector assemblies that provide a convenient and effective manner of connecting a hybrid fiber/wire cable to various devices and components of a fiber-based communication system (such as mid span power insertion devices, end devices, and/or interface devices). Once hybrid fiber/wire cables are terminated using embodiments of the connector assemblies discussed herein, everyday users of a fiber-based communication system are able to configure and rearrange hybrid fiber/wire connections in the field without having to involve a specialized technician.

Further, features of the embodiments of the connector assemblies discussed herein provide various advantages with respect to protecting the integrity of the optical fiber, safety with respect to power transmission, cost, and ease of manufacture. Further, by utilizing existing low-cost SFP-type infrastructure and existing standards, low-cost and reliable connections of hybrid fiber/wire cables can be achieved that conform with current multi-source agreements (MSA) and other standards.

Figure 8A:
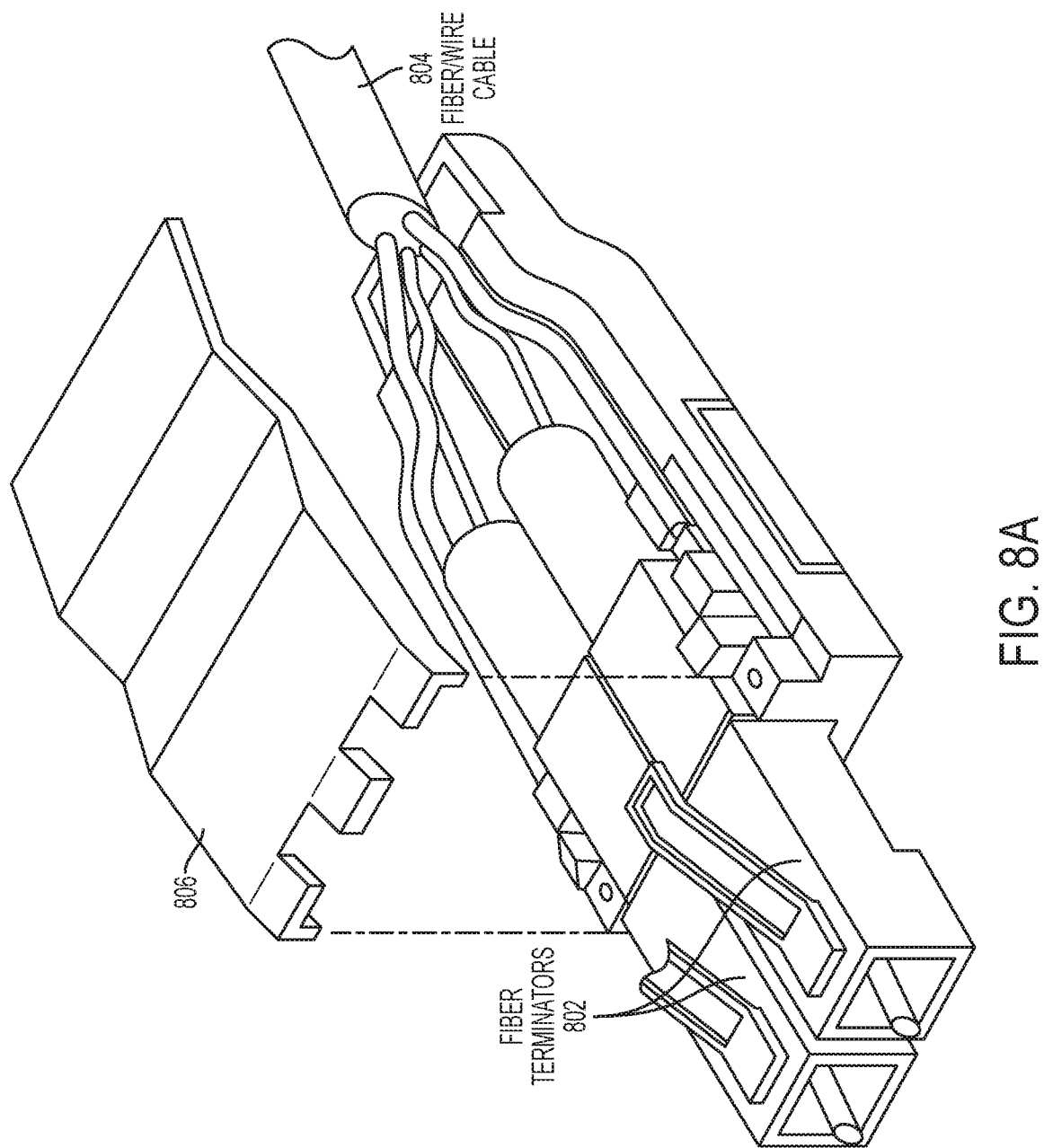
FIG. 8A illustrates an LC connector assembly according to an embodiment of the disclosure.

FIG. 8A is a schematic diagram illustrating an exemplary LC connector assembly utilizing discrete LC connectors. The LC connector assembly includes a top cover 806 which is shown separate from the rest of the LC connector assembly. The LC connector assembly receives a hybrid cable 804. The hybrid cable 804 is deconstructed into its fiber and wire components where the fiber components are terminated with fiber terminators 802.

An improvement of the LC connector assembly of FIG. 8A is that the electrical connections are moved to the bottom of the connector making for a much slimmer design. As such, the width of the LC connector assembly is not much wider than the width of two LC fiber terminators. Also there is an additional improvement where a longer LC connector can be used with individual strain relief for each connector, making the assembly more robust.

Figure 8B:
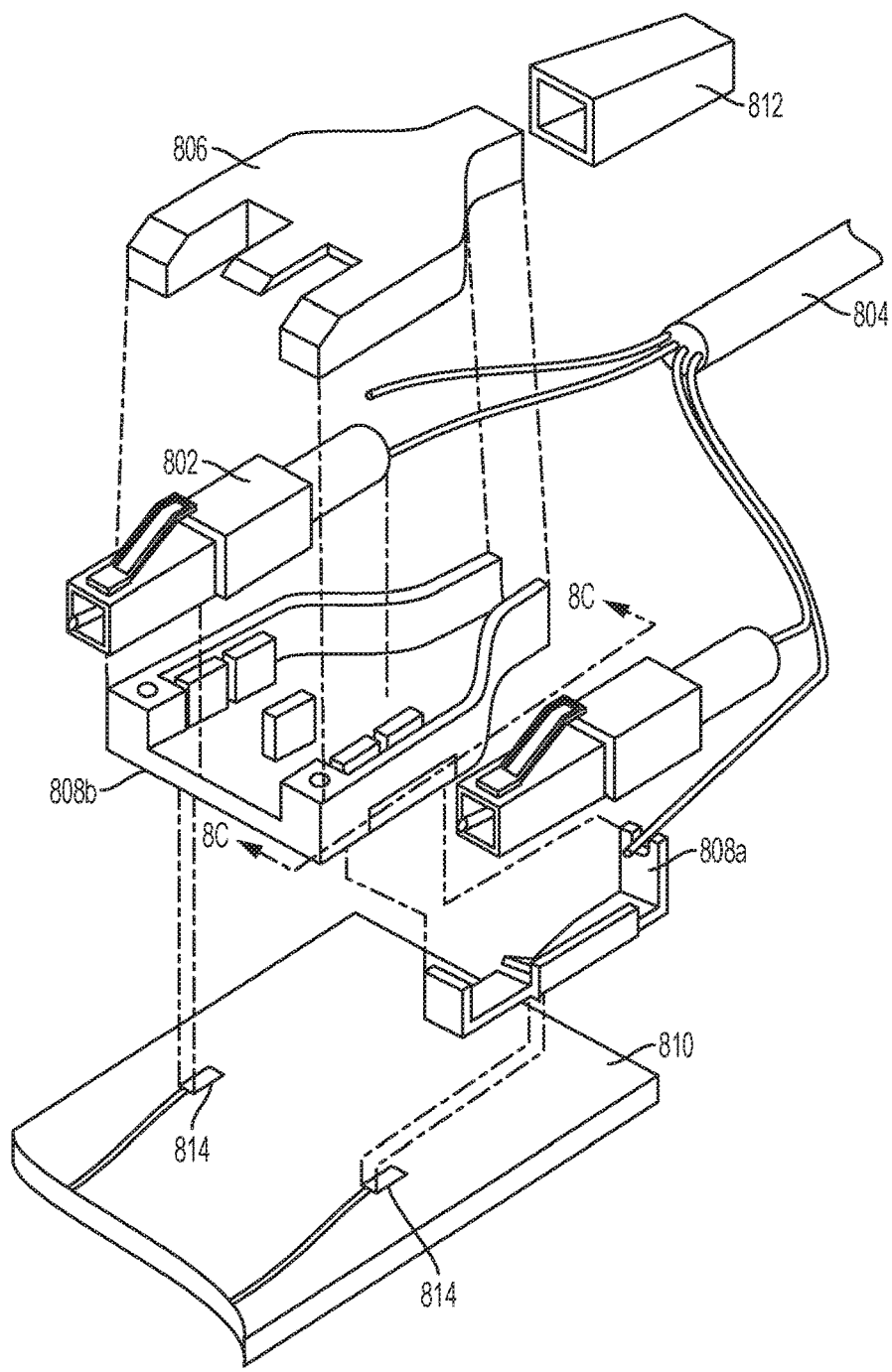
FIG. 8B illustrates components of the exemplary LC connector assembly of FIG. 8A.
Figure 8C:
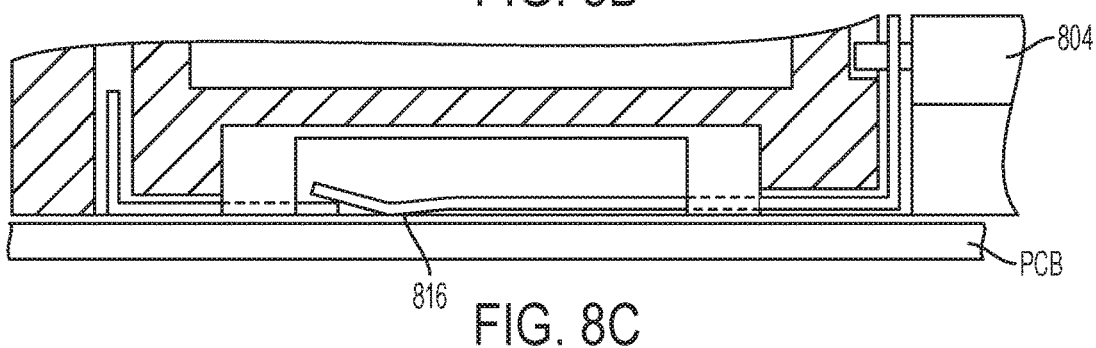
FIG. 8C illustrates a cross-sectional side view of the LC connector assembly of FIG. 8B.
Figure 9C:
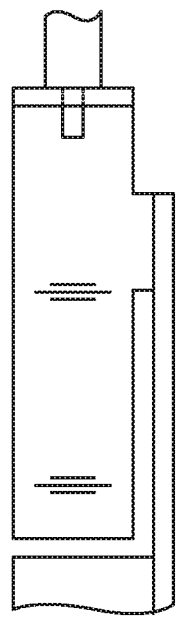
FIGS. 9A-9C illustrate a contact according to an embodiment of the disclosure.
Figure 9B:
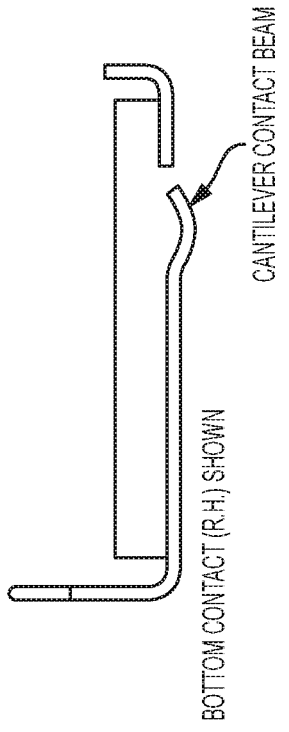
Figure 9A:
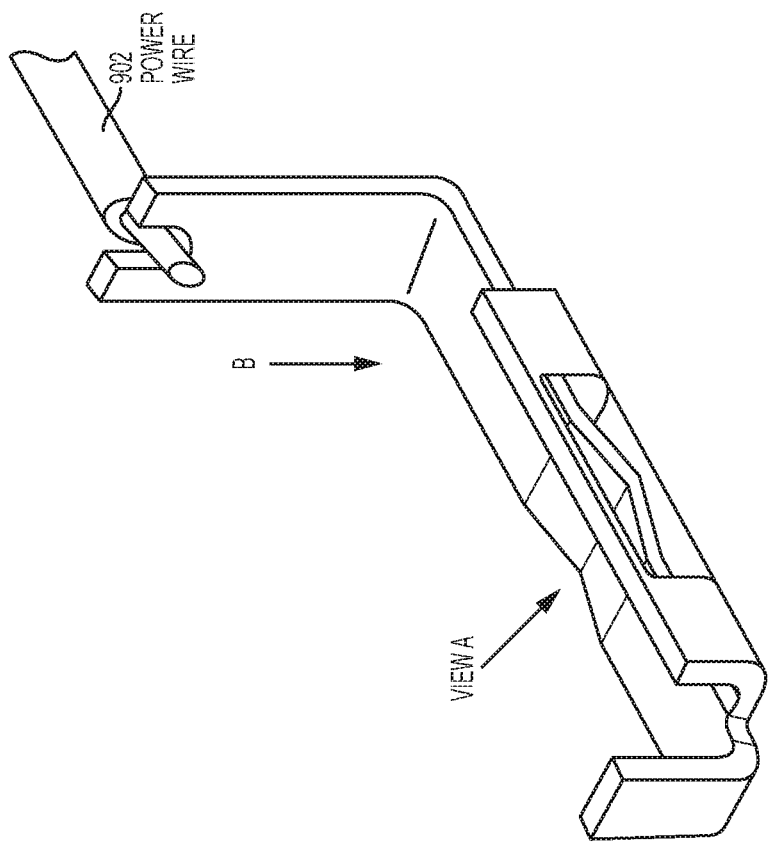

FIG. 8B illustrates components of the exemplary LC connector assembly of FIG. 8A. FIG. 8B illustrates additional detail regarding electrical contact of the wire portion of the hybrid cable 804. The wire portion of the hybrid cable 804 makes electrical connection at both a right side contact 808a and a left side contact 808b of the connector. The right side contact 808a and the left side contact 808b are made of conductive metals, for example, metals including copper. A printed circuit board (PCB) 810 is provided at a client side that receives the LC connector assembly. That is, PCB 810 is part of the item the connector plugs into on the client side PCB. In FIGS. 8A-8C, the electrical contacts on the LC connector assembly are provided on the bottom of the connector assembly. The electrical conductors from the hybrid cable are received by the contacts as shown in FIG. 9A. The LC connector assembly of FIGS. 8A-8C have electrical contacts on the bottom so that power can be delivered to a client side PCB 810. In an example, an SFP connector has a protruding photonic crystal fiber (PCF) "diving board" so the electrical contacts in the connector can make contact with something to deliver power. The LC connector assembly may also include a strain relief 812 for holding the hybrid cable 804 in place.

FIG. 8C illustrates a cross-sectional side view of the LC connector assembly as indicated in FIG. 8B. FIG. 8C is a cross-sectional view through the right side contact 808a. FIG. 8C shows that the right side contact 808a includes a contact beam 816 with a deflected shape. The deflection of the contact beam 816 enables electrical contact of the right side contact 808a with the PCB 810. A pocket is provided such that the contact beam 816 deflects into the pocket to make contact with power pads 814 provided on the PCB 810. Although LC connectors are used in the LC connector assembly shown in FIGS. 8A-8C, other connector types may be utilized in the connector assembly. For example, instead of LC connectors, discrete SC connectors may be used.

FIG. 9A illustrates an exemplary embodiment of a contact according to an embodiment of the disclosure. The contact receives a power wire 902. The contact includes a deflected portion as discussed with respect to FIG. 8C. FIGS. 9B and 9C show side and top views, respectively, of the contact in FIG. 9A.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A round hybrid cable, comprising:
   two metal wires;
   two fiber optic lines;
   a cable jacket enclosing the two metal wires, the two fiber optic lines, and one or more spaces, wherein the enclosing creates the one or more spaces; and
   a synthetic filling configured to fill the one or more spaces created by the enclosing;
   wherein the two metal wires are arranged side by side and the two fiber optic lines are arranged above and below the two metal wires;
   wherein each of the two metal wires defines a respective outer diameter that is at least two times greater than each of the respective outer diameters of the two fiber optic lines; and
   wherein the hybrid cable defines a length extending in a direction normal to its round cross section and, for at least a portion of the length, the two fiber optic lines and the two metal wires are surrounded by, and in direct contact with, the synthetic filling in a single common cylindrical space defined by the cable jacket.

2. The hybrid cable according to claim 1, wherein for at least a portion of the length, each of the two fiber optic lines is suspended within, and completely enclosed by, the synthetic filling.

3. The hybrid cable according to claim 1, wherein the two metal wires each comprise an insulated copper wire.

4. The hybrid cable according to claim 1, wherein a gauge of each metal wire in the two metal wires ranges from 24 American wire gauge (AWG) to 18 AWG such that each metal wire defines an outer diameter between 0.511 mm and 1.024 mm.

5. The hybrid cable according to claim 1, wherein a diameter of the round hybrid cable ranges from 1.5 mm to 3.5 mm;
   wherein the hybrid cable consists of:
      a plurality of metal wires comprising the two metal wires;
      a plurality of fiber optic lines comprising the two fiber optic lines; and
      the cable jacket and the synthetic filling, which fills the one or more spaces defined by the cable jacket that are unoccupied by the plurality of metal wires and the plurality of fiber optic lines.

6. A flat hybrid cable, comprising:
   two metal wires;
   two fiber optic lines;
   a cable jacket enclosing the two metal wires, the two fiber optic lines, and defining a trapezoidal space in which the two metal wires and the two fiber optic lines are commonly disposed; and
   a synthetic filling configured to fill the trapezoidal space created by the enclosing;
   wherein the two metal wires are arranged side by side and the two fiber optic lines are disposed on respective opposing lateral sides of the two metal wires such that the two metal wires are disposed laterally between the two fiber optic lines within the trapezoidal space;
   wherein each of the two metal wires defines a respective outer diameter that is greater than each of the respective outer diameters of the two fiber optic lines.

7. The hybrid cable according to claim 6, wherein the hybrid cable defines a trapezoidal cross section and a length extending in a direction normal to the trapezoidal cross section and, for at least a portion of the length, the two fiber optic lines and the two metal wires are surrounded by, and in direct contact with, the synthetic filling in the trapezoidal space.

8. The hybrid cable according to claim 7, wherein the synthetic filling comprises Kevlar.

9. An assembly comprising:
   the hybrid cable according to claim 6; and
   carpeting comprising a top layer and lower padding;
   wherein the hybrid cable being is disposed under the top layer and surrounded by the lower padding;

wherein the hybrid cable defines a maximum outer height less than a thickness of the lower padding such that the hybrid cable avoids mechanically deforming the top layer.

10. The hybrid cable according to claim 6, wherein a gauge of each of the two metal wires ranges from 24 American wire gauge (AWG) to 18 AWG and the two metal wires each comprise an insulated copper wire.

11. The hybrid cable according to claim 7, wherein the cable jacket defines the trapezoidal cross section such that a maximum height of the flat hybrid cable ranges from 1.5 mm to 2.3 mm and a maximum width of the flat hybrid cable ranges from 5 mm to 7.7 mm.

12. A ribbon hybrid cable, comprising:
two metal wires;
two fiber optic lines;
a cable jacket enclosing the two metal wires, the two fiber optic lines, and one or more spaces, wherein the enclosing creates the one or more spaces; and
a synthetic filling configured to fill the one or more spaces created by the enclosing;
wherein the two fiber optic lines are arranged side by side and the two metal wires are each disposed on a respective opposing lateral side of the two metal wires such that the two fiber optic lines are disposed laterally between the two metal wires;
wherein the metal wires define respective rectangular cross sections while the two fiber optic lines define respective circular cross sections.

13. The hybrid cable according to claim 12, wherein the synthetic filling comprises a synthetic fiber material, the two metal wires comprise a first metal wire and a second metal wire, and the two fiber optic lines comprise a first fiber optic line and a second fiber optic line;
wherein the enclosing creates four discrete spaces filled with the synthetic filling such that:
the first metal wire is disposed directly between a first and a second of the discrete spaces and the second metal wire is disposed directly between a third and a fourth of the discrete spaces;
the synthetic filling in the second discrete space contacts both the first metal wire and the first fiber optic line and the synthetic filling in the third discrete space contacts both the second metal wire and the second fiber optic line.

14. The hybrid cable according to claim 13, wherein the synthetic fiber material comprises Kevlar.

15. The hybrid cable according to claim 12, wherein the two metal wires each comprise an insulated copper wire.

16. The hybrid cable according to claim 12, wherein a gauge of each metal wire in the two metal wires ranges from 24 American wire gauge (AWG) to 18 AWG.

17. The hybrid cable according to claim 12, wherein a height of the ribbon hybrid cable is below 5 mm, a width of the ribbon hybrid cable is below 1 cm, and the width is greater than the height;
wherein each of the rectangular cross sections defines a major axis extending parallel to the width and a minor axis extending parallel to the height.

18. An assembly comprising:
the hybrid cable according to claim 12; and
carpeting comprising a top layer and lower padding;
wherein the hybrid cable is disposed under the top layer and surrounded by the lower padding;
wherein the hybrid cable defines a maximum outer height less than a thickness of the lower padding such that the hybrid cable avoids mechanically deforming the top layer.

19. The hybrid cable according to claim 18, wherein a height of the rectangular cross-section is 0.4 mm and a width of the rectangular cross-section is 2.5 mm.

* * * * *